United States Patent
Knies et al.

(10) Patent No.: US 9,504,959 B2
(45) Date of Patent: Nov. 29, 2016

(54) PROCESS FOR DISPOSAL OF HEXACHLORODISILANE-CONTAINING VAPORS

(75) Inventors: Wolfgang Knies, Burghausen (DE); Karin Boegershausen, Burghausen (DE); Hans Eiblmeier, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 723 days.

(21) Appl. No.: 13/634,508

(22) PCT Filed: Mar. 9, 2011

(86) PCT No.: PCT/EP2011/053523
§ 371 (c)(1),
(2), (4) Date: Sep. 12, 2012

(87) PCT Pub. No.: WO2011/110586
PCT Pub. Date: Sep. 15, 2011

(65) Prior Publication Data
US 2013/0004399 A1    Jan. 3, 2013

(30) Foreign Application Priority Data
Mar. 12, 2010   (DE) .................. 10 2010 002 812

(51) Int. Cl.
*B01D 53/68*  (2006.01)

(52) U.S. Cl.
CPC ......... *B01D 53/68* (2013.01); *B01D 2251/208* (2013.01); *B01D 2251/2067* (2013.01); *B01D 2257/204* (2013.01); *B01D 2258/0216* (2013.01)

(58) Field of Classification Search
None
See application file for complete search history.

(56) References Cited

U.S. PATENT DOCUMENTS

| | | | |
|---|---|---|---|
| 6,218,498 B1 * | 4/2001 | Oberneder et al. | ............. 528/34 |
| 2003/0147798 A1 | 8/2003 | Kirii et al. | |
| 2009/0104100 A1 | 4/2009 | Imamura et al. | |

FOREIGN PATENT DOCUMENTS

| | | |
|---|---|---|
| CN | 101143297 A | 3/2008 |
| DE | 35 03 262 A1 | 8/1986 |
| EP | 2 000 195 A2 | 12/2008 |
| GB | 993 249 A | 5/1965 |
| JP | 11-253741 A2 | 9/1999 |
| WO | 02/12122 A1 | 2/2002 |

OTHER PUBLICATIONS

Susan C. McKarns, Corwin Hansch, William S. Caldwell, Walter T. Morgan, Sarah K. Moore, and David J. Doolittle, "Correlation between Hydrophobicity of Short-Chain Aliphatic Alcohols and Their Ability to Alter Plasma Membrane Integrity", Fundamental and Applied Toxicology 36, 62-70 (1997).*
English abstract of the non-patent literature "Handbook of Chemical Products," Organic Chemical Materials, Publication Date Jan. 31, 2004, Author and Publisher Wang Yangi, Chemical Industry Press, p. 28, the 8th line from the end of the right column to p. 29, line 3 of the left column.

* cited by examiner

*Primary Examiner* — Jennifer A Smith
*Assistant Examiner* — Anita Nassiri Motlagh
(74) *Attorney, Agent, or Firm* — Brooks Kushman P.C.

(57) ABSTRACT

Hexachlorodisilane and residues formed therefrom are disposed of without generating pyrophoric compositions by reaction with urea and alcohol in nonpolar solvent.

7 Claims, No Drawings

PROCESS FOR DISPOSAL OF HEXACHLORODISILANE-CONTAINING VAPORS

CROSS-REFERENCE TO RELATED APPLICATIONS

This application is the U.S. national phase of PCT Appln. No. PCT/EP2011/053523 filed Mar. 9, 2011, which claims priority to German Patent Application No. 10 2010 002 812.6, filed Mar. 12, 2010, which are incorporated herein by reference.

BACKGROUND OF THE INVENTION

1. Field of the Invention

The invention pertains to the disposal of hexachlorodisilane residues.

2. Description of the Related Art

Hexachlorodisilane is being used to an increasing extent in silicon chip manufacture. It is frequently deposited via the gas phase using CVD processes. This, however, leaves vapors which have to be treated after leaving the deposition chambers.

US 2009/0104100 A1 describes the treatment of hexachlorodisilane-containing offgases. This treatment involves first oxidizing the offgas with exclusion of moisture in a complex apparatus, before it is passed through a scrubber filled with water.

The reaction of hexachlorodisilane with water or moisture generally releases HCl gas, which attacks the silicon-silicon bond. This gives rise to Si—H— containing hydrolysis products which decompose on mechanical contact, for example as a result of friction, with sparking. The hydrolysis products in solid form can even decompose under water with sparking.

SUMMARY OF THE INVENTION

It is an object of the invention to improve upon the prior art and more particularly to provide a process in which hexachlorodisilane residues can be disposed of without risk. These and other objects have been surprisingly and unexpectedly achieved by contacting the residues with a mixture of urea and alcohol.

DETAILED DESCRIPTION OF THE PREFERRED EMBODIMENTS

It was necessary to provide a method which enables the risk-free disposal of vapors or else of liquid hexachlorodisilane. It has been found that, on introduction of hexachlorodisilane into a mixture of urea and alcohol, no ignitable mixtures are formed.

It has surprisingly been found that urea is on the one hand sufficiently basic to bind HCl but on the other hand does not catalyze any rearrangements of the hexachlorodisilane whatsoever.

The invention thus provides a process for disposing of hexachlorodisilane-containing vapors, characterized in that hexachlorodisilane-containing vapors are introduced into a mixture comprising a nonpolar hydrocarbon which is liquid at 900 to 1100 hPa and 25° C., urea, and an alcohol which is liquid at 900 to 1100 hPa and 25° C.

The solvents used may, by way of example, be the following nonpolar hydrocarbons: preferably, nonpolar hydrocarbons such as aliphatic or aromatic hydrocarbons, more preferably solvents based on hydrocarbons preferably having a boiling point below 100° C. at standard pressure (900 to 1100 hPa); preferably those having 1 to 20 carbon atoms, more preferably having 6 to 12 carbon atoms, and most preferably octane, nonane, decane, benzene, toluene, and xylene, particular preference being given to xylene.

The alcohols used may, by way of example, be the following:

preferably, alcohols which are liquid at 900 to 1100 hPa and 25° C., preferably those having a boiling point of 50°-150° C., more preferably 90° to 110° C., and most preferably 100° to 120° C., all at a pressure of 900 to 1100 hPa; preferably those having 1 to 6 carbon atoms, more preferably having 3 to 5 carbon atoms, and being, for example, monofunctional alcohols, di- or polyfunctional alcohols, more preferably pentanols such as 1-pentanol, 2-pentanol, and 3-pentanol, and also, 1-butanol, 2-butanol, 3-butanol, 1-propanol, and 2-propanol, particular preference being given to 3-butanol.

In the case of use of high-boiling alcohol for offgas treatment, the following are used based on 1 mol of alcohol:

0.1 to 0.5 mol of urea, more preferably 0.2 to 0.4 mol of urea, and 10 to 200 ml of solvent, more preferably 50 to 100 ml of solvent.

EXAMPLE

Treatment of Hexachlorodisilane-Containing Offgases

The offgases from an apparatus in which hexachlorodisilane is distilled under nitrogen are passed through a mixture of 50 ml of xylene, 50 ml of t-butanol and 10 g of urea. The mixture is stirred with a magnetic stirrer. At the gas outlet, in contrast to an apparatus in which the offgas is passed only through silicone oil, there is no formation of white deposits which ignite on contact with a metal.

In the context of the present invention, unless stated otherwise in each case, all amounts and percentages are based on weight and all percentages are based on the total weight, all temperatures are room temperature, 25° C., and all pressures are at the surrounding atmosphere, i.e. 900 to 1100 hPa. All viscosities are determined at 25° C.

The invention claimed is:

1. A process for disposing of hexachlorodisilane-containing vapors, comprising introducing hexachlorodisilane-containing vapors into a mixture comprising a nonpolar hydrocarbon which is liquid at 900 to 1100 hPa and 25° C., urea, and an alcohol which is liquid at 900 to 1100 hPa and 25° C.

2. The process for disposing of hexachlorodisilane-containing vapors of claim 1, wherein the hydrocarbon has a boiling point below 100° C. at a pressure of 900 to 1100 hPa.

3. The process for disposing of hexachlorodisilane-containing vapors of claim 1, wherein the hydrocarbon has 1 to 20 carbon atoms.

4. The process for disposing of hexachlorodisilane-containing vapors of claim 3, wherein the hydrocarbon has 6 to 12 carbon atoms.

5. The process for disposing of hexachlorodisilane-containing vapors of claim 1, wherein the hydrocarbon comprises xylene.

6. The process for disposing of hexachlorodisilane-containing vapors of claim 1, wherein the alcohol has 1 to 6 carbon atoms.

7. The process for disposing of hexachlorodisilane-containing vapors of claim 1, wherein at least one alcohol is selected from the group consisting of 1-pentanol, 2-pentanol, 3-pentanol, 1-butanol, 2-butanol, 3-butanol, 1-propanol, and 2-propanol.

* * * * *